Feb. 6, 1968 B. C. MOORE 3,367,169
SPHERICAL CHAMBER FOR CALIBRATING VACUUM GAUGES
Filed June 14, 1965 2 Sheets-Sheet 2

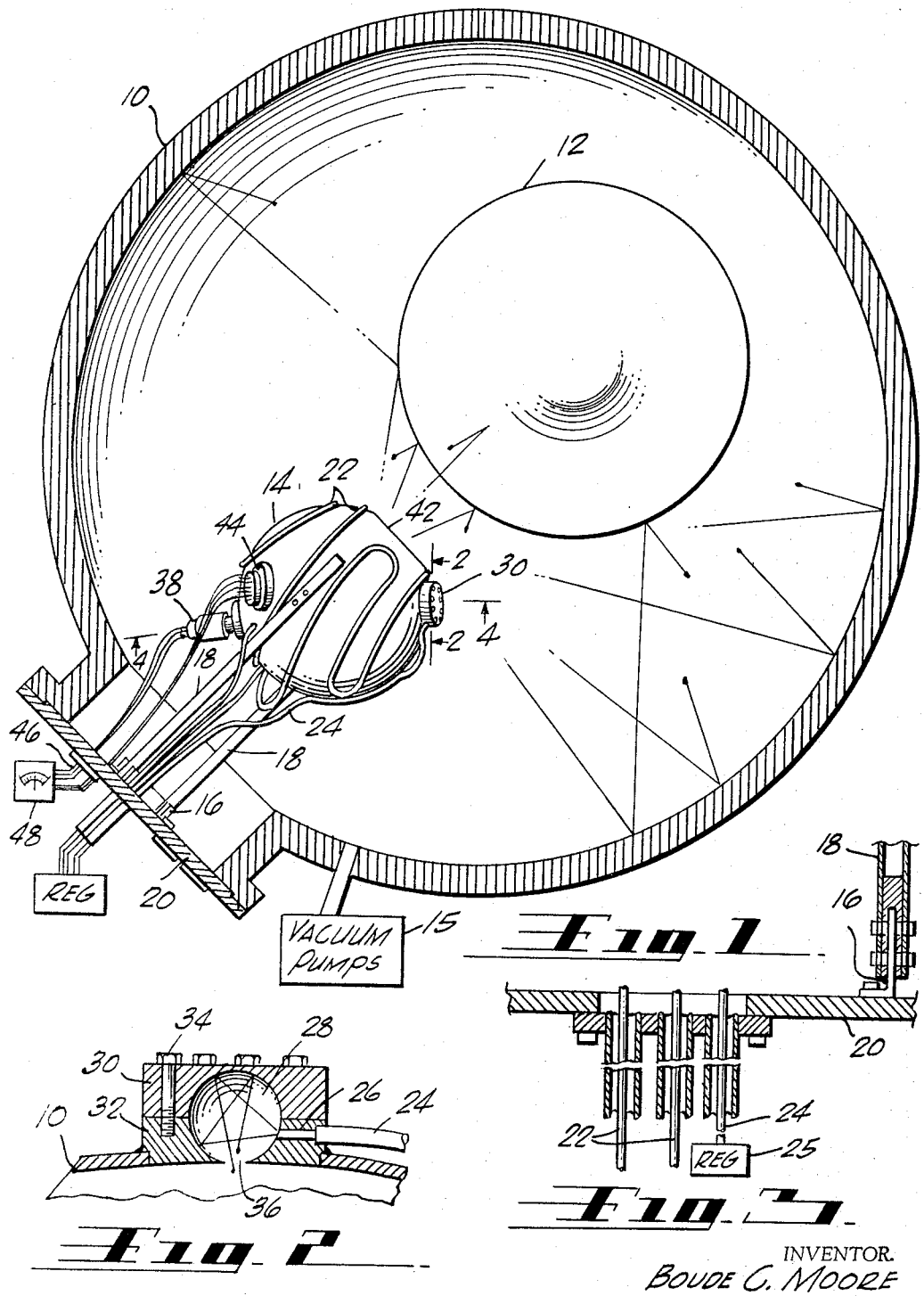

INVENTOR.
BOUDE C. MOORE
BY
-AGENT-

United States Patent Office 3,367,169
Patented Feb. 6, 1968

3,367,169
SPHERICAL CHAMBER FOR CALIBRATING
VACUUM GAUGES
Boude C. Moore, Sepulveda, Los Angeles, Calif., assignor to McDonnell Douglas Corporation, Santa Monica, Calif., a corporation of Maryland
Filed June 14, 1965, Ser. No. 463,738
4 Claims. (Cl. 73—4)

ABSTRACT OF THE DISCLOSURE

A vacuum calibrator for internally calibrating vacuum gauges which is spherically shaped to facilitate even gas molecular distribution. Also, further molecular distribution is achieved through the use of an additional distributing means prior to entry of the molecules of gas.

This invention relates to dynamic calibration chambers useful, for example, in calibrating vacuum gauges and more particularly for calibrating vacuum gauges prior to their location in a low pressure environment.

An established method of calibrating vacuum gauges is as follows: A chamber which contains the vacuum gauge to be calibrated is evacuated in the order of $10^{-12}$ atmospheres. A measured flow of gas Q is passed into the chamber through an orifice of known dimensions with a speed S. The pressure P developed by the gas flow can then be calculated by the equation $P=Q/S$. The vacuum gauge reading is equivalent to the calculated pressure P plus the initial chamber pressure ($10^{-12}$ atm.). This procedure is repeated for several different flow rates of gas establishing a pressure curve for the vacuum gauge. The gauge is then considered calibrated.

It has been common practice, once the gauge has been calibrated to remove the gauge from the calibration chamber, exposing such to atmospheric pressure, and then inserting the gauge in a low pressure chamber to take readings of the pressure while making tests on equipment. Because the gauge is designed to read extremely low gas pressures, exposing the gauge to atmospheric pressure may cause the gauge to malfunction and not operate correctly. The instant invention obviates the prior need for removing the gauge from the calibration chamber in a low pressure chamber.

This invention relates to a vacuum gauge calibration chamber placed in a low pressure environment. A gas is introduced at a certain flow rate into the chamber establishing a certain pressure. By knowing the flow rate of gas and the physical dimensions of the chamber, the gas pressure can be established mathematically. The vacuum gauge is read at this time (in units of electrical current) establishing a specific unit of electrical current equal to a calculated gas pressure. This procedure is repeated with several different gas flow rates establishing a "pressure curve" for the particular vacuum gauge.

It is to be noted that in the calculation of the pressure in the calibration chamber, a Maxwellian condition is assumed, i.e., random distribution of gas molecules. Accordingly, such as condition is only possible in theory, therefore, correction factors have been devised under actual conditions. Heretofore, cylindrically shaped calibration chambers have been employed for which no exact correction factors have been derived. Therefore, one object of this invention is to employ a spherically shaped calibration chamber for which exact correction factors can be calculated.

Another object of this invention is to incorporate a calibration chamber in a low pressure chamber.

It is another object of the invention to calibrate the vacuum gauge in a low pressure chamber without removing the gauge from the chamber.

It is another object of this invention to be able to calibrate a vacuum gauge while tests are being conducted in the low pressure chamber.

It is another object of the invention to provide a more accurate method of calibrating vacuum gauges.

It is still another object of the invention to employ a means of randomly distributing the molecules of gas in the calibrator for the purpose of a more accurate calibration of the vacuum gauge.

Other objects, purposes and characteristic features will become obvious as the description of the invention progresses.

FIGURE 1 is a diagrammatic view of a low pressure chamber incorporating a calibration chamber of the instant invention;

FIG. 2 is a view taken along line 2—2 of FIG. 1 showing the interior of a random molecule distributing means;

FIG. 3 is a side view of the plate through which entrance to the low pressure chamber is obtained.

Figure 4:
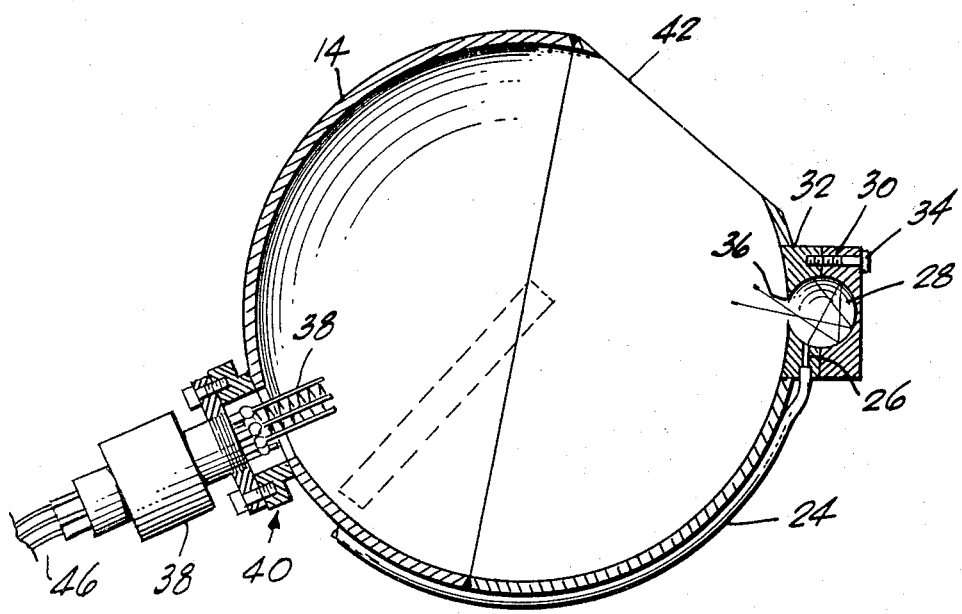
FIG. 4 is a diagrammatic view of the calibration chamber taken through line 4—4 of FIG. 1.

Shown in FIG. 1 is a low pressure chamber 10 having in the interior thereof an article to be tested 12 and a vacuum gauge spherical calibration chamber 14. The low pressure chamber is evacuated of air by several vacuum pumps 15.

The spherical calibration chamber 14 is attached to the interior wall of the low pressure chamber 10 by conventional supporting brackets 16. Supporting arms 18 connect the chamber 14 to the supporting brackets 16. A sealing plate 20 is attached to the low pressure chamber through which access to the spherical calibration chamber 14 may be obtained. Through the sealing plate 20 cryogenic lines 22 pass and are wrapped around the spherical calibration chamber 14. Liquid nitrogen is pumped through the lines 22 to cause the temperature of the spherical calibration chamber to approach the temperature of the liquid nitrogen. Such lowering of the temperature increases calibrating accuracy.

Line 24 conducts a measured flow of gas from a regulator 25 to the spherical calibration chamber inlet 26. The gas first enters a spherical inlet chamber 28 formed from two hemispherical portions 30 and 32. Hemispherical portion 32 is attached to the spherical calibration chamber 14 by welding and hemispherical portion 30 is attached to portion 32 by bolts 34. Orifice 36 located between the inlet chamber and the calibration chamber admits the molecules of gas to enter the spherical calibration chamber 14. Inlet chamber 28 functions to permit the molecules of gas to rebound within its interior, eventually entering the spherical calibration chamber 14 through orifice 36. This results in a more random distribution (Maxwellian condition) than merely shooting a stream of gas directly into the spherical calibration chamber 14.

Located within the spherical calibration chamber 14 are vacuum gauges 38 and 44 which are fixed to the wall of the spherical calibration chamber by plate means 40. Usually more than one gauge is employed to assure accuracy and in case of malfunction of one of the gauges. The vacuum gauges may be located at any desired position within the chamber 14 each denoting the same reading because the gas molecules are randomly distributed throughout the chamber. Heretofore, in cylindrically shaped calibration chambers, such accuracy could not be obtained. The gauge readings are transmitted by means of the electrical conductors 46 to an indicating device 48.

The molecules of gas that have entered the calibration chamber 14 are discharged through orifice 42 into the interior of the low pressure chamber 10 which is constantly being evacuated by the vacuum pumps 15. By controlling the size of the orifices 42 and 36, known pressures can be established within the spherical calibration chamber 14 with respect to the near vacuum of the interior of the low pressure chamber. It has been found that with a 39 foot diameter low pressure chamber, an 11 inch diameter spherical calibration chamber is adequate having a discharge orifice of 4 inches in diameter and an inlet orifice of ⅛ inch in diameter. However, it is to be known that the dimensions are nominal and that practically any set of dimensions could be employed.

Numerous modifications could be made of the instant invention without departing from the scope thereof. For example, additional small spherical chambers could be employed in a series relationship to increase accuracy by further random distributing of the gas molecules.

Various other changes in form and relative arrangements of the parts, which will now appear to those skilled in the art may be made without departing from the scope of the invention. Reference is, therefore, to be made to the appended claims for a definition of the limits of the invention.

I claim:

1. In a dynamic calibration chamber for calibrating gas pressure gauges, said calibration chamber having a gas inlet and outlet, means to supply variable flow rates of gas to said inlet, a gas pressure gauge located in said calibration chamber, the improvement comprising:

said calibration chamber being spherically shaped, said gas outlet being larger than said gas inlet;

distributing means located between the gas inlet and the calibration chamber randomly distributing molecules of gas, said distributing means being a second spherical chamber smaller in diameter than the diameter of said spherical calibration chamber, whereby said second spherical chamber acts as a baffle to prevent a jet of gas from flowing directly from the inlet into the calibration chamber.

2. In combination with a low pressure chamber:

a dynamic calibration chamber for calibrating gas pressure gauges, said calibration chamber having a gas inlet and outlet, means to supply variable flow rates of gas to said inlet, said outlet discharging into the interior of the low pressure chamber;

a gas pressure gauge located in said calibration chamber, said calibration chamber being spherically shaped;

distributing means located between the gas inlet and the calibration chamber randomly distributing molecules of gas, said distributing means being a second spherical chamber, whereby said second spherical chamber acts as a baffle to prevent a jet of the gas from flowing directly from the inlet to the calibration chamber.

3. In combination with a low pressure chamber:

a dynamic calibration chamber for calibrating gas pressure gauges, said calibration chamber having a gas inlet and outlet, means to supply variable flow rates of gas to said inlet, said outlet discharging into the interior of the low pressure chamber;

a gas pressure gauge located in said calibration chamber, said calibration chamber being spherically shaped, said gas outlet being larger in area than said gas inlet; and distributing means located between the gas inlet and the calibration chamber randomly distributing molecules of gas, said distributing means being a second spherical chamber smaller in diameter than the diameter of the spherical calibration chamber whereby the second spherical chamber acts as a baffle to prevent a jet of gas from flowing directly from the inlet to the calibration chamber.

4. In a dynamic spherically shaped calibration chamber for calibrating gas pressure gauges, said calibration chamber having a gas inlet and outlet, means to supply variable flow rates of gas to said inlet, a gas pressure gauge located in said calibration chamber, the improvement comprising:

distributing means located between said gas inlet and said calibration chamber randomly distributing molecules of gas, said distributing means being a second spherically shaped chamber, whereby second chamber acts as a baffle to prevent a jet of gas from flowing directly from the inlet into the calibration chamber.

References Cited

V. E. Hoffman, Vacuum Gauge Calibration to $5 \times 10$ Torr, Research/Development, April 1963, pp. 62, 64, 65.

LOUIS R. PRINCE, *Primary Examiner.*

S. C. SWISHER, *Examiner.*